United States Patent [19]

Fujishima

[11] Patent Number: 5,530,649

[45] Date of Patent: Jun. 25, 1996

[54] APPARATUS FOR STARTING PASSIVE SAFETY DEVICE OF AUTOMOTIVE VEHICLE

[75] Inventor: Hiromichi Fujishima, Toyota, Japan

[73] Assignee: Toyota Jidosha Kabushiki Kaisha, Aichi-Ken, Japan

[21] Appl. No.: 233,852

[22] Filed: Apr. 26, 1994

[30] Foreign Application Priority Data

May 6, 1993 [JP] Japan .................................. 5-105668

[51] Int. Cl.$^6$ .................................. B60R 21/32
[52] U.S. Cl. .................. 364/424.05; 340/669; 307/10.1; 280/735; 180/282
[58] Field of Search ............................ 364/424.05, 734; 340/669, 436; 307/10.1; 280/734, 735; 180/274, 282

[56] References Cited

U.S. PATENT DOCUMENTS

| 4,410,875 | 10/1983 | Spies et al. ........................ 280/735 |
| 5,040,118 | 8/1991 | Diller ................................ 364/424.05 |
| 5,216,607 | 6/1993 | Diller et al. ...................... 364/424.05 |
| 5,317,512 | 5/1994 | Ota et al. ......................... 364/424.05 |
| 5,337,238 | 8/1994 | Gioutsos et al. .................. 364/424.05 |
| 5,339,242 | 8/1994 | Reid et al. ........................ 364/424.05 |
| 5,363,302 | 11/1994 | Allen et al. ...................... 364/424.05 |

FOREIGN PATENT DOCUMENTS

4-325348 11/1992 Japan.
4-325349 11/1992 Japan.

*Primary Examiner*—Kevin J. Teska
*Assistant Examiner*—Tyrone V. Walker
*Attorney, Agent, or Firm*—Oliff & Berridge

[57] ABSTRACT

A passive safety device starting apparatus includes: a sampling unit for sampling a plurality of acceleration values from an automotive vehicle according to periodic interrupt signals; an integration unit for calculating the sum of a plurality of acceleration values sampled within each of a plurality of first time intervals, for storing a number of the sums, each of which is calculated within a second time interval greater than one of the first time intervals, in a corresponding number of data areas of a memory, and for generating a value of an integral based on the number of the sums within each first time interval; and a starting unit for updating the integral value according to the periodic interrupt signals by adding a new acceleration value to the integral value generated by the integration unit after the new acceleration value is sampled by the sampling unit, and for starting a passive safety device when the updated integral value is detected to be greater than a threshold value.

9 Claims, 7 Drawing Sheets

----- INVENTION

——— PRIOR ART

APPARATUS FOR STARTING PASSIVE SAFETY DEVICE OF AUTOMOTIVE VEHICLE

BACKGROUND OF THE INVENTION

1. Field of the Invention

The present invention generally relates to a passive safety device starting apparatus, and more particularly to an apparatus for starting a passive safety device when a collision impact of an automotive vehicle is detected.

2. Description of the Related Art

Japanese Laid-Open Patent Application No. 4-325349 discloses a proposed apparatus for starting a passive safety device when a collision impact of an automotive vehicle is detected. In the above apparatus, a plurality of acceleration data of the automotive vehicle are sampled by an acceleration sensor. The value of an integral over a given time interval is calculated based on the sampled acceleration data, and the integral value is stored.

In the above apparatus, it is detected whether or not the stored integral value is greater than a reference value. When the integral value is detected to be greater than the reference value, the apparatus generates an activation signal by which the action of a passive safety device in the vehicle is initiated.

However, the apparatus disclosed in the above-mentioned publication has its limitations in that the activation signal may be generated after a time delay as the integral value is updated after the sum of the sampled acceleration values over the given time interval is calculated. If the activation signal is generated after a time delay, starting the action passive safety device is delayed from the occurrence of the actual collision.

SUMMARY OF THE INVENTION

Accordingly, it is a general object of the present invention to provide an improved passive safety device starting apparatus in which the above described problem is eliminated.

Another object of the present invention is to provide a passive safety device starting apparatus which is more sensitive to a collision impact of an automotive vehicle than prior art apparatuses and generates an activation signal without delay so as to make the starting action of a passive safety device more sensitive when a collision impact is detected.

The above mentioned objects of the present invention are achieved by a passive safety device starting apparatus which includes: a sampling unit for sampling a plurality of acceleration values from an automotive vehicle according to periodic interrupt signals; an integration unit for calculating the sum of a plurality of acceleration values sampled within each of a plurality of first time intervals, for storing a number of the sums, each of which is calculated within a second time interval greater than one of the first time intervals, in a corresponding number of data areas of a memory, and for generating a value of an integral based on the number of the sums within each first time interval; and a starting unit for updating the integral value according to the periodic interrupt signals by adding a new acceleration value to the integral value generated by the integration unit after the new acceleration value is sampled by the sampling unit, and for starting a passive safety device when the updated integral value is detected to be greater than a threshold value.

According to the present invention, the passive safety device starting apparatus generates an activation signal without delay even when the impact of a collision at a relatively low vehicle speed is detected. Since the integral value is updated after a new acceleration value of one interrupt period is sampled, it is possible to prevent a delay in the starting action of the passive safety device.

BRIEF DESCRIPTION OF THE DRAWINGS

The above and other objects, features and advantages of the present invention will be more apparent from the following detailed description when read in conjunction with the accompanying drawings in which.

DESCRIPTION OF THE PREFERRED EMBODIMENTS

Figure 1:
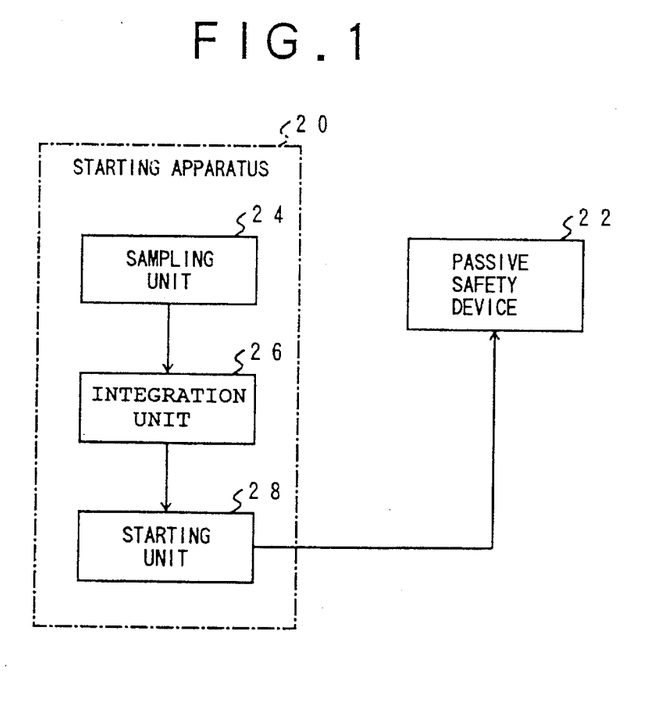
FIG. 1 is a block diagram showing a passive safety device starting apparatus according to one embodiment of the present invention.

A description will now be given, with reference to FIG. 1, of a passive safety device starting apparatus according to the present invention. In FIG. 1, the passive safety device starting apparatus 20 comprises a sampling unit 24, an integration unit 26, and a starting unit 28. The starting apparatus 20 starts the action of a passive safety device 22 when a collision impact of an automotive vehicle is detected. According to the present invention, the sampling unit 24, the integration unit 26, and the starting unit 28 are realized by a controlling program of a microcomputer having a read only memory.

The sampling unit 24 in FIG. 1 samples a plurality of acceleration values from an automotive vehicle according to periodic interrupt signals. The integration unit 26 calculates the sum of a plurality of acceleration values sampled within each of a plurality of first time intervals. The integration unit 26 stores a number of the sums, each of which is calculated within a second time interval greater than one of the first time intervals, in a corresponding number of data areas of a memory. The integration unit 26 generates a value of an integral based on the number of sums described above within each first time interval.

The starting unit 28 updates the integral value according to the periodic interrupt signals by adding a new acceleration value to the integral value generated by the integration unit 26 after the new acceleration value is sampled by the sampling unit 24, and starts a passive safety device 22 when the updated integral value is detected to be greater than a threshold value.

The passive safety device starting apparatus 20 according to the present invention can generate an activation signal without delay when a collision impact of the automotive vehicle is detected. Since the integral value is updated after a new acceleration value of one interrupt period is sampled, it is possible to prevent the starting of the action of the passive safety device from being delayed.

Figure 2:
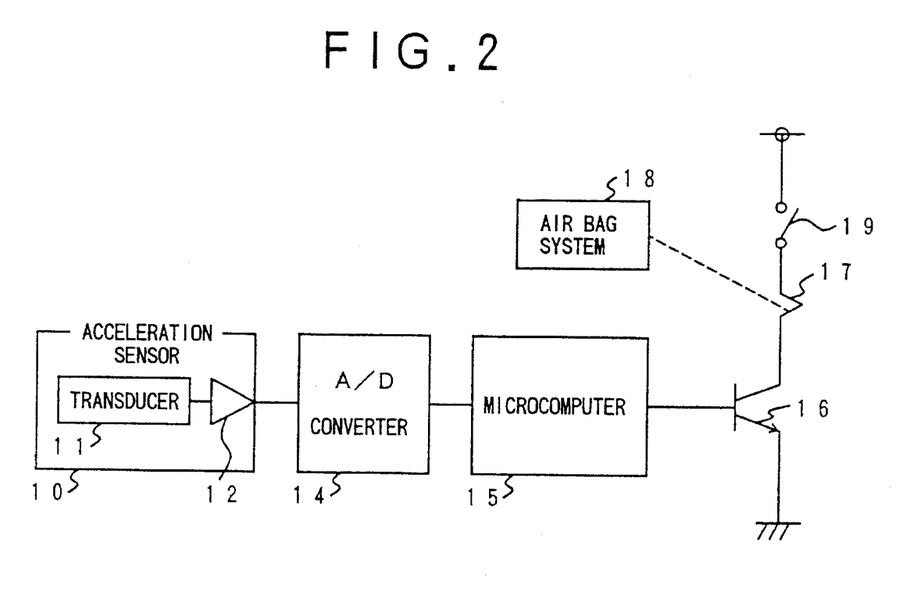
FIG. 2 is a block diagram showing one embodiment of a passive safety device starting apparatus to which the present invention is applied.

Next, a description will be given, with reference to FIG. 2, of a passive safety device starting system of an automotive vehicle to which the present invention is applied. In FIG. 2, the passive safety device starting system comprises an acceleration sensor 10, an analog-to-digital (A/D) converter 14, and a microcomputer 15. An air bag system 18 in FIG. 2 is a passive safety device of the automotive vehicle, and the action of the air bag system 18 is started by an activation signal generated by the microcomputer 15.

The acceleration sensor 10 in FIG. 2 includes a transducer 11 for converting a vehicle acceleration into an electric signal with corresponding amplitude and polarity, and an amplifier 12 for amplifying the electric signal from the transducer 11 to output an analog acceleration signal.

The A/D converter 14 in FIG. 2 converts the acceleration signal from the acceleration sensor 10 into a digital signal, and supplies the digital signal to the microcomputer 15.

The microcomputer 15 in FIG. 2 performs collision impact detecting steps in accordance with digital signals from the A/D converter 14. In the course of the collision impact detecting steps, the microcomputer 15 generates an activation signal that switches on a transistor 16 by which a starting current is supplied to a squib 17, so that the action of the air bag system 18 within the automotive vehicle is initiated.

In order to ensure the safety of the operation of the air bag system, a power supply for supplying the starting current is connected to one end of the squib 17 via a mechanical switch 19, and the mechanical switch 19 is turned ON when the automotive vehicle is at a relatively low speed. The squib 17 is electrically connected to the power supply through the mechanical switch 19 before the activation signal is generated by the microcomputer 15 at the detection of a collision impact of the automotive vehicle.

The level of vehicle acceleration sensed when a collision impact occurs at a low vehicle speed is lower than the level of vehicle acceleration sensed when a collision impact occurs at a high vehicle speed. When the collision impact occurs at a low vehicle speed, it is necessary to calculate an integral over a relatively long period, in order to correctly detect the occurrence of the low-speed collision impact of the vehicle. On the other hand, when the collision impact occurs at a high vehicle speed, the level of vehicle acceleration sensed is high. It is therefore necessary to increase the response speed of the collision impact detection by calculating an integral over a relatively short period.

Figure 3:
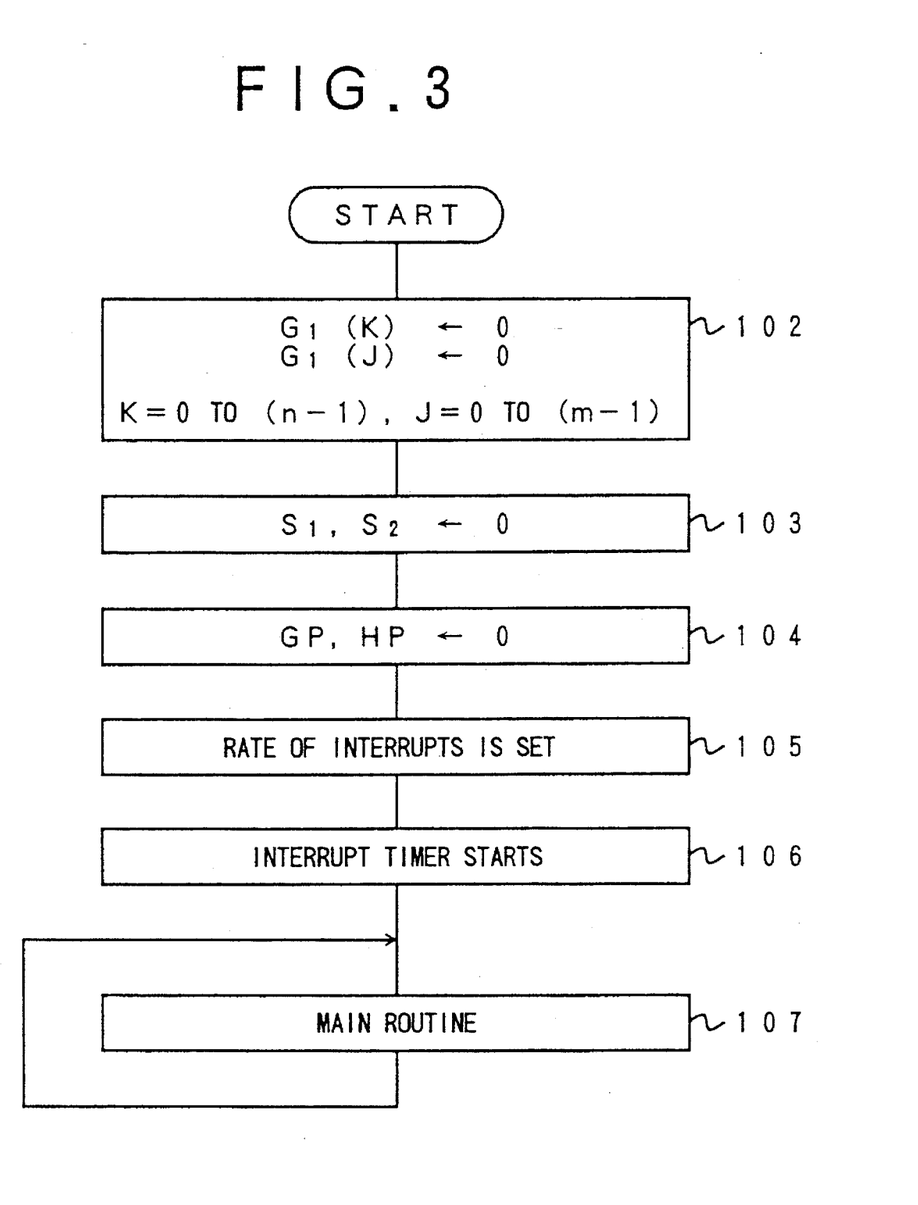
FIG. 3 is a flow diagram for explaining initialization steps performed by one embodiment of the passive safety device starting apparatus of the present invention.
Figure 4:
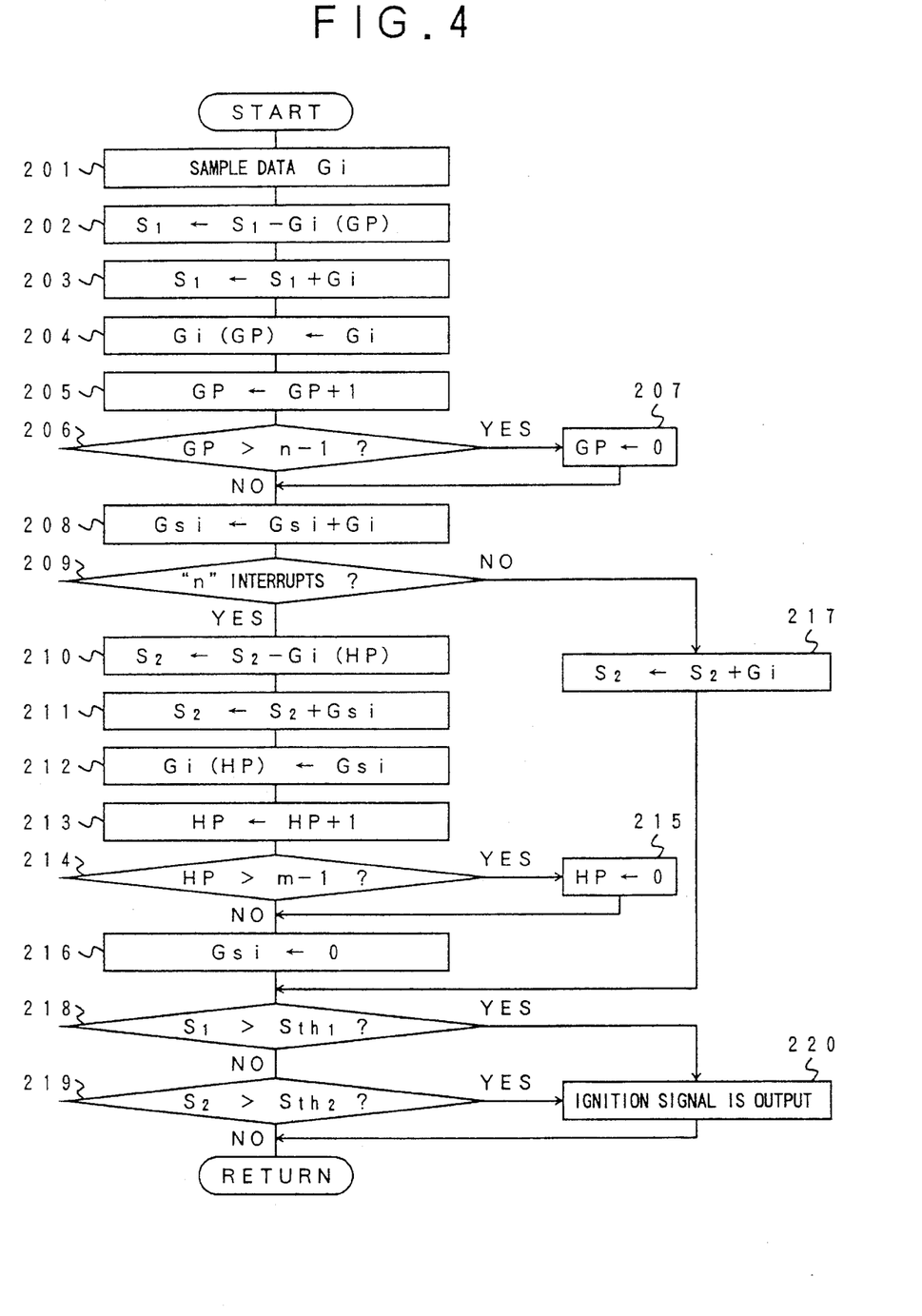
FIG. 4 is a flow diagram for explaining collision impact detecting steps performed by an embodiment of the passive safety device starting apparatus of the present invention.

Next, a description will be given, with reference to FIGS. 3 and 4, of the operation of the passive safety device starting apparatus according to the present invention. FIG. 3 shows the initialization steps performed by the microcomputer 15 in FIG. 2. FIG. 4 shows the collision impact detecting steps performed by the microcomputer 15.

When a key switch (not shown in FIG. 2) of the automotive vehicle is turned ON by a vehicle operator to cause the vehicle to start operating, electric power of a storage battery (not shown in FIG. 2) is supplied to the parts of the passive safety device starting apparatus in FIG. 2. The microcomputer 15 at this time performs the initialization steps in FIG. 3.

In the initialization steps shown in FIG. 3, step 102 resets all the acceleration data of data areas G1(K) and G2(J) of a memory of the microcomputer 15 to zero (where K=0 through (n−1), J=0 through (m−1), and n and m are given integers). Step 103 resets the integral data of data areas S1 and S2 of the memory to zero. Step 104 sets the addresses of pointers GP and HP to zero.

In the memory mentioned above, various pieces of acceleration data used to obtain the integral value concerning the high-speed collision impact are stored in the data areas G1(K), and various pieces of acceleration data used to obtain the integral value concerning the low-speed collision impact are stored in the data areas G2(J). The pointer GP indicates the location of a specific memory area among the plurality of the data areas G1(K). The pointer HP indicates the location of a specific memory area among the plurality of the data areas G2(J). An integral value concerning the high-speed collision impact is stored in the data area S1, and an integral value concerning the low-speed collision impact is stored in the data area S2.

Step 105 sets the rate of interrupts (or the interrupt period), issued by an interrupt timer of the microcomputer 15, to a frequency associated with a period h. The frequency associated with the period h is equal to the frequency of the system clock on which the execution of operating actions done by the parts of the passive safety device starting apparatus is based. Step 106 makes the interrupt timer start so that the collision impact detecting steps in FIG. 4 are started. Thus, the microcomputer 15 periodically carries out the collision impact detecting steps in FIG. 4 according to the interrupts issued by the interrupt timer. Step 107 performs a main routine in which a diagnostic procedure of the air bag system 18 and other procedures are performed.

In the collision impact detecting steps in FIG. 4, steps 201 through 207 are performed to calculate a plurality of acceleration values and generates an integral value concerning the high-speed collision impact case based on the plurality of acceleration values. Step 201 samples the current acceleration value Gi from the acceleration sensor 10 via the A/D converter 14 according to a periodic interrupt signal. Each interrupt causes a sample of acceleration value to be taken from the automotive vehicle.

Step 202 subtracts the oldest acceleration value Gi(GP) from the integral value of the data area S1. Step 203 adds the current acceleration value Gi to the integral value in the data area S1. Thus, the integral value in the data area S1 is updated with the sampled acceleration value Gi at steps 202 and 203. In other words, the oldest acceleration value Gi(GP) is subtracted from the integral value, and the current acceleration value Gi is added to the integral value.

Step 204 moves the acceleration value Gi, sampled at step 201, to the data area of the acceleration value Gi(GP). Step 205 increments the address of the pointer GP. Step 206 detects whether or not the address of the pointer GP is greater than the integer (n−1). If the result at step 206 is affirmative, step 207 resets the address of the pointer GP to zero. If the result at step 206 is negative, the following step 208 is performed. Thus, the above steps 201 through 205 are repeated until the address of the pointer GP reaches the integer "n".

In the collision impact detecting steps in FIG. 4, the following steps 208 through 217 are performed to calculate a plurality of acceleration values and calculate an integral value concerning the low-speed collision impact case based on the plurality of acceleration values. As previously described, it is necessary to calculate an integral value over a relatively long period in the low-speed collision impact case, in order to correctly detect the occurrence of the collision impact of the vehicle. However, the number of the data areas of the memory in which the acceleration values may be stored is limited. For this reason, a temporary data area Gsi in the memory is provided, and the sum of a plurality of acceleration values sampled within each of a plurality of first time intervals is stored in the temporary date area Gsi. According to the present invention, one of the first time intervals within which the sum of the plurality of acceleration values is stored in the temporary data area Gsi of the memory corresponds to the time period of "n" interrupts.

Step 208 adds the current acceleration value Gi, sampled at step 201, to the value in the temporary data area Gsi. The value in the temporary data area Gsi is equal to the sum of a plurality of acceleration values sampled within each of a plurality of the first time intervals, and it is called the acceleration value Gsi. Step 209 detects whether or not the number of interrupts issued by the interrupt timer has reached "n". If the result at step 209 is affirmative, step 210 is performed. If the result at step 209 is negative, step 217 is performed.

If the above step 209 detected that the number of interrupts issued by the interrupt timer has reached "n", step 210 subtracts the oldest acceleration value Gi(HP) from the integral value of the data area S2. Step 211 adds the acceleration value Gsi to the integral value of the data area S2. Thus, the integral value of the data area S2 is updated with the acceleration value Gsi at steps 210 and 211. Step 212 moves the acceleration value Gsi to the data area of the oldest acceleration value Gi(HP). Step 213 increments the address of the pointer HP. Step 214 detects whether or not the address of the pointer HP is greater than the integer (m−1). If the result at step 214 is affirmative, step 215 resets the address of the pointer HP to zero. If the result at step 214 is negative, the following step 216 is performed.

The above steps 210 through 214 are thus repeated until the address of the pointer HP has reached "m". After the end of the repetition, the "m" sums of the plurality of acceleration values, each of the sums being calculated within a second time interval greater than one of the first time intervals, are stored in a corresponding number of data areas G2(J) of the memory of the microcomputer 15, where J=0 through (m−1). Since the above steps 210 through 214 are performed once at the occurrence of the "n" interrupts and the steps 210 through 214 are repeatedly performed "m" times for each of the "n" interrupts, the integration time within which the "m" sums of the plurality of acceleration values are calculated and stored is equal to the time period "n.m.h". The integral value (S2) over the time period "n.m.h" is generated based on the "m" sums.

After the above steps 210 through 215 are performed, step 216 resets the value in the temporary data area Gsi to zero. The integral value of the next cycle will be stored in the temporary data area Gsi.

If the above step 209 detected that the number of interrupts issued by the interrupt timer has not reached "n" step 217 adds the acceleration value Gi to the integral value in the data area S2. Thus, the integral value in the data area S2 concerning the low-speed collision impact is updated with the acceleration value Gi according to the periodic interrupt issued by the interrupt timer. Thus, by performing the above step 217, an integral value over a relatively long time period can be generated with respect to the low-speed collision impact so as to correctly detect the collision impact of the vehicle.

According to the collision impact detecting steps in FIG. 4, the maximum integration time concerning the low-speed collision impact for which the integral value (S2) is calculated is equal to "n.m.h+(n−1).h". In other words, the integration time Tw1 concerning the low-speed collision impact for which the integral value (S2) is calculated varies from "n.m.h" to "n.m.h+(n−1) .h".

After the step 216 or the step 217 is performed, step 218 detects whether or not the resulting integral value (S1) is greater than a predetermined threshold value $Sth_1$ concerning the high-speed collision impact. Step 219 detects whether or not the resulting integral value (S2) is greater than a predetermined threshold value $Sth_2$ concerning the low-speed collision impact. If the result at either step 218 or step 219 is affirmative, step 220 generates an activation signal. This activation signal is output from the microcomputer 15 to the transistor 16, and the starting current is supplied to the squib 17 so that the action of the air bag system 18 in the vehicle is started. If the results at both steps 218 and 219 are negative, the above step 220 is not performed and the collision impact detecting procedure ends.

Figure 5A:
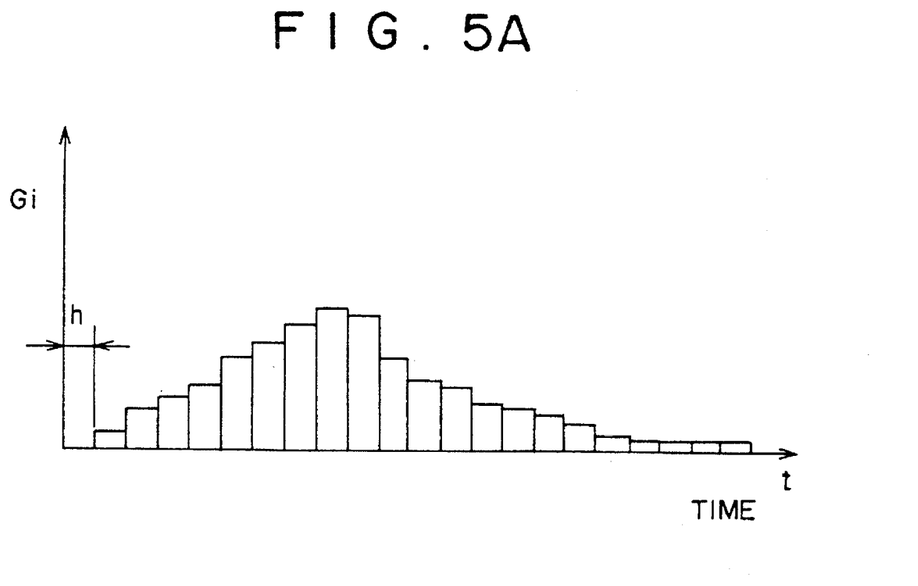
FIGS. 5A and 5B are time charts for explaining the operation of one embodiment of the passive safety device starting apparatus.
Figure 5B:
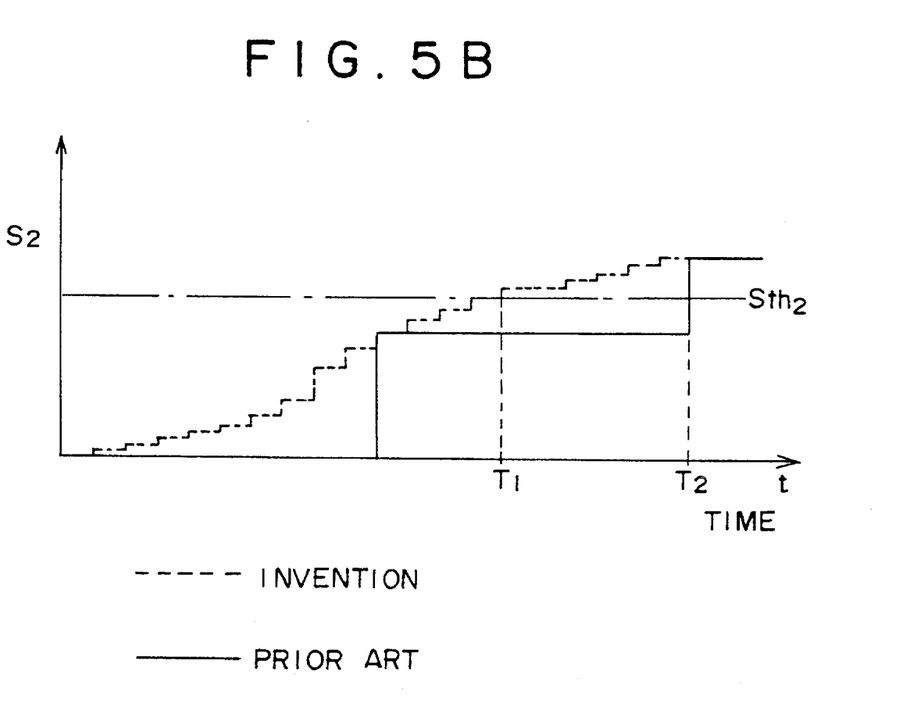

FIG. 5A shows a plurality of sampled acceleration data Gi at a plurality of time points when a low-speed collision impact of the vehicle is detected. FIG. 5B shows changes of the integral value S2 which are calculated based on the acceleration data Gi shown in FIG. 5B. In the case of the conventional apparatus disclosed in the before mentioned publication, the integral data S2 is updated after the "n" acceleration values Gi have been sampled, as indicated by a solid line in FIG. 5B. The integer "n" in FIG. 5B is equal to, for example, 10. On the other hand, in the case of the passive safety device starting apparatus of the present invention, the integral data S2 is updated each time the acceleration value Gi of one interrupt period "h" is sampled, as indicated by a dotted line in FIG. 5B. Thus, the passive safety device starting apparatus of the present invention can generate an activation signal without delay as soon as the integral value S2 becomes greater than the threshold value Sth2.

When the integral value S2, indicated by the solid line in FIG. 5B, becomes greater than the threshold value Sth2 indicated by a dotted chain line in FIG. 5B, the activation signal is generated by the conventional apparatus at the time point T2. Thus, a certain delay time is needed in the case of the conventional apparatus since the integral value S2 is smaller than the threshold value Sth2 prior to that time point T2. On the other hand, the activation signal can be generated at the time T1 by the passive safety device starting apparatus of the present invention. Accordingly, it is possible to prevent delays in starting the action of the passive safety device in the automotive vehicle which normally would be delayed until "n" acceleration values were sampled.

Figure 6:
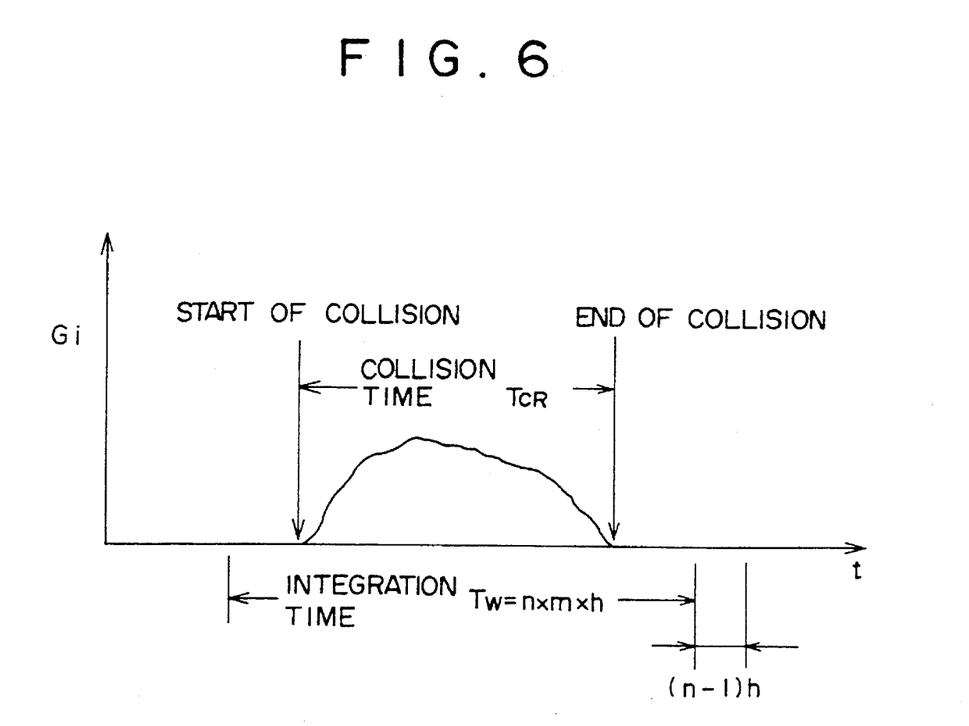
FIG. 6 is a time chart for explaining the setting of an integration time used by the collision impact detecting steps in FIG. 4.

As described above, the integration time Tw1 concerning the low-speed collision impact for which the integral value (S2) is calculated varies from "n.m.h" to "n.m.h+(n−1).h". However, if an integration time (Tw1) adequately greater than a collision time Tcr of the low-speed collision impact is set (Tw1="n.m.h") as indicated in FIG. 6, the undesired influence of the variation of the integration time Tw1 described above can be eliminated.

Next, a description will be given, with reference to FIGS. 7 and 8, of collision impact detecting steps performed in another embodiment of the present invention. In this embodiment, the difference DGi between acceleration values is calculated, and the integral value Si is calculated and stored only when the difference DGi is detected to be greater than a threshold value. The low-speed collision impact and the high-speed collision impact are detected in accordance with the stored integral value Si.

Figure 7:
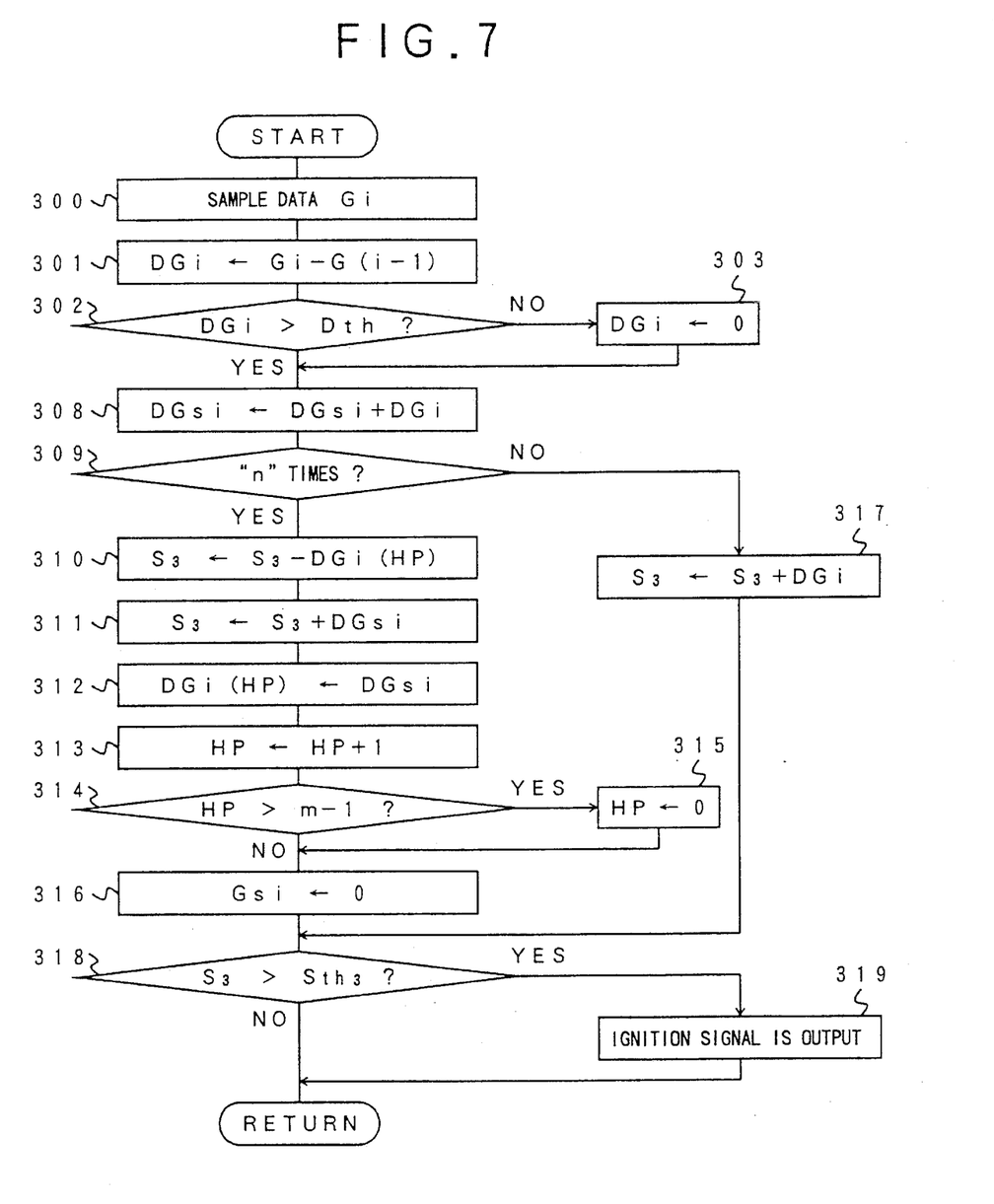
FIG. 7 is a flow diagram for explaining collision impact detecting steps performed by another embodiment of the passive safety device starting apparatus of the present invention.

In the collision impact detecting steps in FIG. 7, step 300 samples the current acceleration value Gi from the acceleration sensor 10 via the A/D converter 14 according to the periodic interrupt signal from the interrupt timer. Step 301 subtracts the previous acceleration value G(i−1) from the current acceleration value Gi to calculate the difference DGi between the two values [DGi=Gi−G(i−1)]. Step 302 detects whether or not the difference DGi is greater than a predetermined threshold value Dth concerning the difference between the acceleration values.

If the result at step 302 is negative (DGi≦Dth), step 303 resets the difference DGi to zero. If the result at step 302 is affirmative (DGi>Dth), the following step 308 is performed.

In the collision impact detecting steps in FIG. 7, the subsequent steps 308 through 317 are similar to the steps 208 through 217 shown in FIG. 4, and the steps are performed to calculate and store the integral value and the acceleration difference values concerning the low-speed collision impact. In order to correctly detect the occurrence of the low-speed collision impact of the vehicle, a temporary data area DGsi is provided in the memory, and the sum of the acceleration difference values is stored in the temporary data area DGsi.

Step 308 adds the acceleration difference value DGi, obtained at step 301, to the value in the temporary data area DGsi. The value in the temporary data area DGsi which is the sum of a plurality of acceleration difference values is called the acceleration difference value DGsi. Step 309 detects whether or not the number of interrupts issued by the interrupt timer is equal to "n". If the result at step 309 is affirmative, step 310 is performed. If the result at step 309 is negative, step 317 is performed.

If the above step 309 detected that the number of interrupts made by the interrupt timer is equal to the integer "n", step 310 subtracts the oldest acceleration difference value DGi(HP) from the integral value in a data area S3 of the memory of the microcomputer 15. Step 311 adds the acceleration difference value DGsi to the integral value S3. Thus, the integral value S3 is updated with the acceleration difference value DGsi. Step 312 moves the acceleration difference value DGsi to the data area of the oldest acceleration difference value DGi(HP). Step 313 increments the address of the pointer HP. Step 314 detects whether or not the address of the pointer HP is greater than the integer (m−1). If the result at step 314 is affirmative, step 315 resets the address of the pointer HP to zero. If the result at step 314 is negative, the following step 316 is performed.

The above steps 310 through 315 are repeated until the address of the pointer HP has reached "m". The "m" acceleration difference values are stored in the "m" data areas of the microcomputer 15. As the collision impact detecting steps in FIG. 7 are repeatedly performed at the occurrences of the "n" interrupts and the steps 310 through 315 are performed "m" times for each of the "n" interrupts, the integration time for which the integral value (S2) is calculated is equal to the "n.m.h".

After the above steps 310 through 315 are performed, step 316 resets the value of the temporary data area DGsi to zero.

The integral value of the next cycle will be stored in the temporary data area DGsi.

If the above step 309 detected that the number of interrupts issued by the interrupt timer is not equal to the integer "n", the number of the interrupts has not yet reached "n". At this time, step 317 adds the acceleration difference value DGi to the integral value of the data area S3. Thus, the integral value of the data area S3 concerning the low-speed collision impact is updated with the acceleration difference value DGi at the occurrence of each interrupt. Thus, by performing the above step 317, an integral value of a relatively long time period can be calculated with respect to the low-speed collision impact.

After the step 316 or the step 317 is performed, step 318 detects whether or not the resulting integral value (S3) is greater than a predetermined threshold value Sth3 concerning the low-speed collision impact. If the result at step 318 is affirmative, step 319 generates the activation signal. This activation signal is output from the microcomputer 15 to the transistor 16, and the starting current is supplied to the squib 17 so that the action of the air bag system 18 in the vehicle is started. If the result at step 318 is negative, the above step 319 is not performed and the collision impact detecting procedure ends.

Figure 8A:
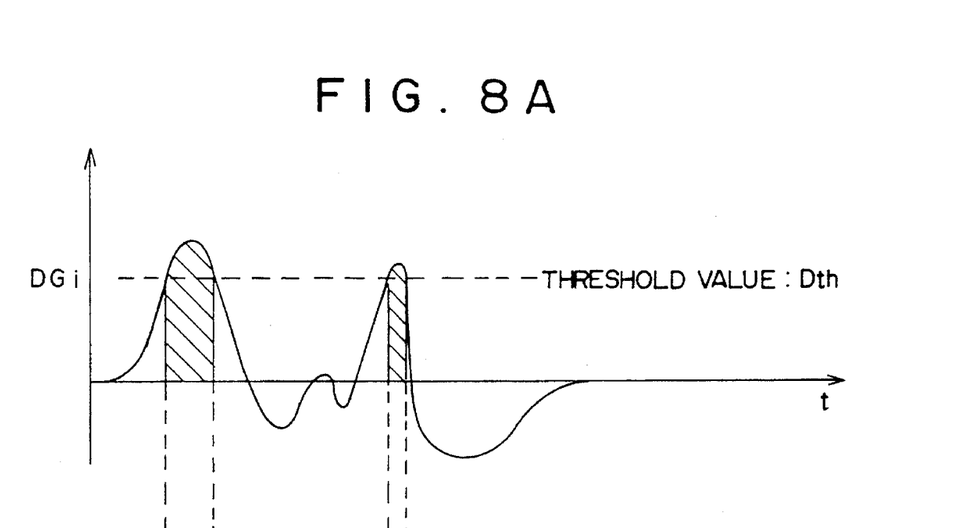
FIGS. 8A and 8B are time charts for explaining the operation of the passive safety device starting apparatus of another embodiment of the present invention.
Figure 8B:
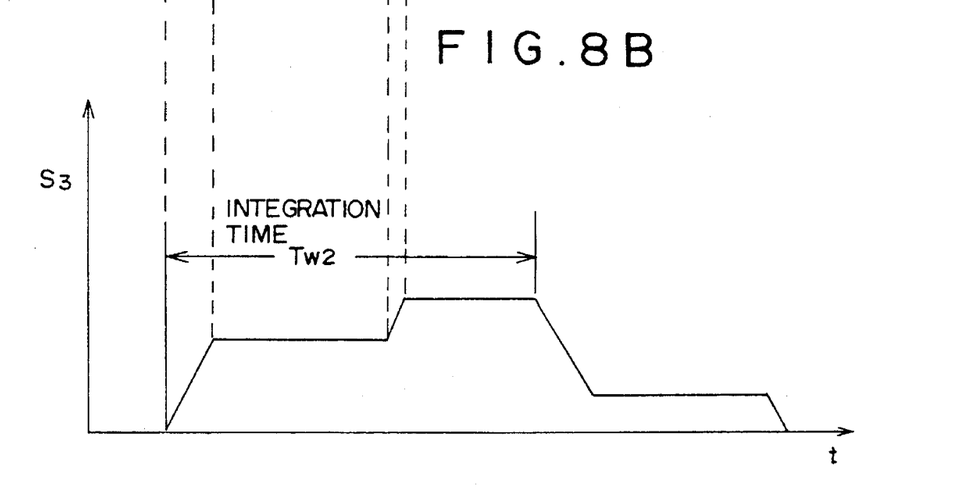

FIG. 8A shows changes of the acceleration difference value DGi concerning the low-speed collision impact. When the acceleration difference value DGi, as shown in FIG. 8A, is greater than the threshold value Dth, for example, at the two shaded portions in FIG. 8A, the acceleration values are added to the integral value S3. FIG. 8B shows changes of the integral value S3 which is calculated based on the acceleration difference value DGi. The integration time Tw2 in this example is indicated by the arrow in FIG. 8B.

In addition, instead of the calculation at the above step 301, the microcomputer 15 may calculate the acceleration difference value DGi according to the following formula:

$$DGi=[\{G(i)+G(i-1)+ \ldots +G(i-n+1)\}$$

$$-\{G(i-n)+G(i-n+1)+ \ldots +G(i-2n+1)\}]/2n.$$

By means of the above formula, it is possible to eliminate an undesired influence on the sampled acceleration values Gi due to the noise in the signal from the acceleration sensor 10.

Further, the present invention is not limited to the above described embodiments, and variations and modifications may be made without departing from the scope of the present invention.

What is claimed is:

1. An apparatus for starting a passive safety device of an automotive vehicle, said apparatus comprising:

(a) sampling means for sampling a plurality of acceleration values, each acceleration value sampled after a first time interval;

(b) integration means, comprising:
   means for calculating a sum of the sampled acceleration values over each of a plurality of first time intervals, wherein said first time intervals over which each sum of the sampled acceleration values is calculated are distinct from each other with no overlapping time;
   means for calculating a plurality of said sums over a second time interval greater than one of said first time intervals;
   means for storing the plurality of said sums in a corresponding number of data areas of memory; and
   means for generating a value of an integral based on said stored sums over said second time interval;

(c) updating means for updating said integral value by adding a new acceleration value obtained after each first time interval to said integral value generated by said integration means after said new acceleration value is sampled by said sampling means; and (d) starting means for starting the passive safety device when said updated integral value is detected to be greater than a threshold value.

2. An apparatus according to claim 1, further comprising means for storing a first number of the sampled acceleration values in a corresponding number of first data areas of the memory.

3. An apparatus according to claim 2, further comprising means for generating an additional integral value by subtracting the oldest acceleration value from the first number of the sampled acceleration values after a new acceleration value is sampled, and by adding the new acceleration value to the first number of the sampled acceleration values.

4. An apparatus according to claim 3, wherein said starting means comprising means for detecting whether the thus generated additional integral value is greater than an additional threshold value, the additional threshold value being predetermined with respect to a collision impact at a relatively high vehicle speed.

5. An apparatus according to claim 3, wherein said starting means comprises means for generating an activation signal when the thus generated additional integral value is detected to be greater than the additional threshold value, said activation signal being output to a transistor by which an action of the passive safety device within the automotive vehicle is started.

6. An apparatus according to claim 1, further comprising means for detecting whether the updated integral value is greater than the threshold value, the threshold value being predetermined with respect to a collision impact of the automotive vehicle at a relatively low speed.

7. An apparatus according to claim 1, wherein the starting means comprises means for generating an activation signal when the updated integral value is detected to be greater than the threshold value, said activation signal being output to a transistor by which an action of the passive safety device within the automotive vehicle is started.

8. A method of starting a passive safety device of an automotive vehicle, comprising the steps of:

(a) sampling a plurality of acceleration values from the vehicle, each acceleration value sampled after a first time interval;

(b) calculating a sum of the sampled acceleration values over each of a plurality of first time intervals, wherein said first time intervals over which each sum of the sampled acceleration values is calculated are distinct from each other with no overlapping time;

(c) calculating a plurality of said sums over a second time interval greater than one of said first time intervals;

(d) storing the plurality of said sums in a corresponding number of data areas of memory;

(e) generating a value of an integral based on said stored sums over said second time interval;

(f) updating said integral value by adding a new acceleration value obtained after each first time interval to said integral value after said new acceleration value is sampled; and (g) starting the passive safety device when said updated integral value is detected to be greater than a threshold value.

9. The method according to claim 8, wherein said updating step further comprises the steps of:

determining whether the new acceleration value has increased a count to be equal to a predetermined number;

creating a sum value by adding each new acceleration value;

reestablishing the integral value by subtracting the oldest sum from the integral value and adding the sum value when the count is equal to the predetermined number.

\* \* \* \* \*